(12) United States Patent
Li

(10) Patent No.: US 6,458,217 B1
(45) Date of Patent: Oct. 1, 2002

(54) SUPERADIABATIC COMBUSTION GENERATION OF REDUCING ATMOSPHERE FOR METAL HEAT TREATMENT

(75) Inventor: Yao-En Li, Buffalo Grove, IL (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 09/515,871

(22) Filed: Feb. 29, 2000

(51) Int. Cl.⁷ .............................. C21D 1/76; C01B 3/36; B01J 12/00
(52) U.S. Cl. .................... 148/235; 148/634; 148/712
(58) Field of Search ................. 148/235, 634, 148/712; 266/252, 254, 257

(56) References Cited

U.S. PATENT DOCUMENTS

| | | | |
|---|---|---|---|
| 4,992,113 A | 2/1991 | Baldo et al. | 148/160 |
| 5,057,164 A | 10/1991 | Nilsson et al. | 148/16 |
| 5,069,728 A | 12/1991 | Rancon et al. | 148/16 |
| 5,165,884 A | 11/1992 | Martin et al. | 431/7 |
| 5,207,839 A | 5/1993 | Claverie et al. | 148/206 |
| 5,242,509 A | 9/1993 | Rancon et al. | 148/206 |
| 5,284,526 A | 2/1994 | Garg et al. | 148/208 |
| 5,298,090 A | 3/1994 | Garg et al. | 148/208 |
| 5,320,518 A | 6/1994 | Stilger et al. | 431/7 |
| 5,417,774 A | 5/1995 | Garg et al. | 148/208 |
| 5,441,581 A | 8/1995 | Van Den Sype et al. | 148/634 |
| 5,785,774 A | 7/1998 | Van Den Sype et al. | 148/634 |
| 5,968,457 A | 10/1999 | Van Den Sype et al. | 422/177 |

FOREIGN PATENT DOCUMENTS

EP 0 931 842 A1 7/1999

OTHER PUBLICATIONS

Hanamura, Katsunori; Echigo, Ryozo, Superadiabatic Combustion in a Porous Medium, Int. J. Heat Mass Transfer (1993), 36(13), 3201–9 (Provided Abstract Only), 1993.*
Weinberg, F. *Superadiabatic Combustion and Its Applications*, International School–Seminar, Contributed Papers, Minsk, Belarus, Aug. 28–Sep. 1, 1995, pp. 1–20.
L.A. Kennedy et al., "Superadiabatic Combustion in Porous Media: Wave Propagation, Instabilities, New Type of Chemical Reactor", Fluid Mechanics Research, vol. 22, No. 2, 1995, pp. 1–26, XP001035195.
M.K. Drayton et al., *Syngas Production Using Superadiabatic Combustion of Ultra–Rich Methane–Air Mixtures*, Aug. 1998, Combustion Institute, 27$^{th}$ Symposium, Pittsburgh, PA, pp. 1361–1367, XP001036516.

* cited by examiner

*Primary Examiner*—Sikyin Ip
(74) *Attorney, Agent, or Firm*—Linda K. Russell

(57) ABSTRACT

Systems useful for superadiabatic combustion generation of a reducing atmosphere for metal heat treatment include a superadiabatic reactor which supplies a reducing atmosphere to a metal heat treatment apparatus. In one aspect, the reactor includes a porous medium and a start-up heater in the flow path of the gas that is to be heated. In another aspect, the gas is passed through a porous medium in alternating, opposite directions by the control of valves which lead the gas to and from the medium. In yet another aspect, a gas inflow pipe leads into an insulated porous bed from which the gas flows in a counter flow manner around the inflow pipe.

4 Claims, 4 Drawing Sheets

SUPERADIABATIC COMBUSTION GENERATION OF REDUCING ATMOSPHERE FOR METAL HEAT TREATMENT

BACKGROUND OF THE INVENTION

1 Field of the Invention

The present invention relates to the generation of a reducing atmosphere for heat treatment of metals, and more particularly to generating a reducing atmosphere for heat treatment of metals from superadiabatic combustion.

2. Brief Description of the Related Art

Heat treatment of metals has been utilized to improve the properties of metals. For example, U.S. Pat. Nos. 5,284,526, 5,298,090, and 5,417,774, all issued to Garg et al., describe processes for annealing metals in which nitrogen and residual oxygen are passed through a platinum-group catalyst reactor to convert the oxygen to water, and then passing this reaction product along with a hydrocarbon into the heating zone of a continuous furnace. According to Garg, the water is converted to carbon dioxide and hydrogen by water gas shift reaction, and a reducing atmosphere is produced for the heat treatment of metal in the furnace.

Such prior processes suffer from several disadvantages. The requirement for a catalyst in order for the reaction to proceed adds additional costs to the process and apparatus. Furthermore, for many prior processes, the reaction gases must be heated, which further complicates the process and makes the overall process less efficient and significantly more costly. These prior processes are generally concerned with combustion in a fuel-lean reaction.

Metal heat treatment in a controlled atmosphere has previously been described. See, for example, U.S. Pat. Nos. 4,992,113, 5,057,164, 5,069,728, 5,207,839, and 5,242,509, each of which is incorporated in its entirety herein by reference.

SUMMARY OF THE INVENTION

In accordance with a first exemplary embodiment in accordance with the present invention, a process of heat treating metal comprises the steps of superadiabatically reacting a hydrocarbon with oxygen to produce hydrogen, and exposing the metal to the hydrogen.

In accordance with a second exemplary embodiment in accordance with the present invention, a system useful for heat treating metal with a reducing atmosphere comprises a superadiabatic reactor having a product gas outlet, and a metal heat treatment apparatus having an inlet in fluid communication with said reactor gas outlet.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
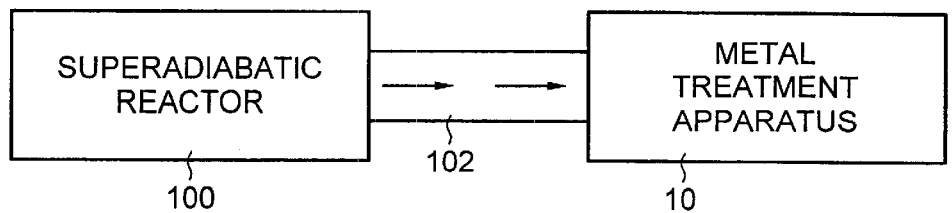
FIG. 1 diagrammically illustrates a system in accordance with the present invention.

Referring to the drawing figures, like reference numerals designate identical or corresponding elements throughout the several figures.

The present invention relates generally to the reaction of an oxidant, preferably oxygen, by introducing hydrocarbon gases, e.g., $CH_4$, which produces a reducing atmosphere for metal heat treatment:

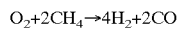

$$O_2 + 2CH_4 \rightarrow 4H_2 + 2CO$$

The reaction of a hydrocarbon fuel and oxygen has, in the prior art processes, been catalyzed and performed as a fuel-lean reaction at high temperatures, involving the further application of continuous external heating supplied to the reaction chamber. The present invention, in contrast, eliminates the need for both a catalyst and continuous external heating, and is preferably conducted fuel-rich. Thus, as in the patents to Garg, above, the fuel-lean reaction evolves carbon dioxide and water, while the fuel-rich reaction preferable in the present invention evolves carbon monoxide and (diatomic) hydrogen gas useful as a reducing atmosphere for metal heat treatment.

By using superadiabatic combustion, also termed excess enthalpy combustion, both the continuous external heating and the catalyst of the prior art can be eliminated from the reaction chamber. In general terms, once ignition starts with the assistance of a startup heater, the startup heater can be turned off and the temperature of the superadiabatic reactor of the present invention can be maintained at combustion temperature.

Excess enthalpy (superadiabatic) combustion has been well examined in the literature. See, e.g., Weinberg, F., *Superadiabatic Combustion and Its Applications,* in International School-Seminar, Contributed Papers, Minsk, Belarus, Aug. 28–Sept. 1, 1995, pp. 1–20, which reviews superadiabatic combustion principles and describes several exemplary superadiabatic reactors. In general, the effect of superadiabatic combustion occurs when a mixture of gaseous fuel and an oxidizer, which mixture has an overall low caloric value (i.e., low adiabatic temperature) passes through an inert, solid, porous body having a high heat capacity. The intense heat exchange during oxidation of the fuel between the combustion gases and the porous body permits accumulation of energy from combustion in the body. Thus, the flame temperature achieved can be much higher than the adiabatic temperature of the feed fuel mixture, because of the effective heat transfer feedback to the feed gases from the porous body. Although superadiabatic reactors have been proposed for use in some applications, the present invention for the first time combines the advantages of excess enthalpy combustion with a metal heat treatment process and apparatus.

FIG. 1 illustrates a system in accordance with the present invention, which includes a superadiabatic reactor 100 connected to an exemplary metal treatment apparatus 10 by a flow pathway 102. Metal to be treated (not illustrated) is exposed in apparatus 10 to a treatment gas supplied to the apparatus from reactor 100. The details of apparatus 10 will be readily understood by one of ordinary skill in the art, and may be any of numerous metal treatment apparatus which have been or will be proposed, including those described in the aforementioned U.S. Pat. Nos. 4,992,113, 5,057,164, 5,069,728, 5,207,839, and 5,242,509, including high temperature furnaces. Accordingly, additional details of apparatus 10 are not included herein.

Figure 2:
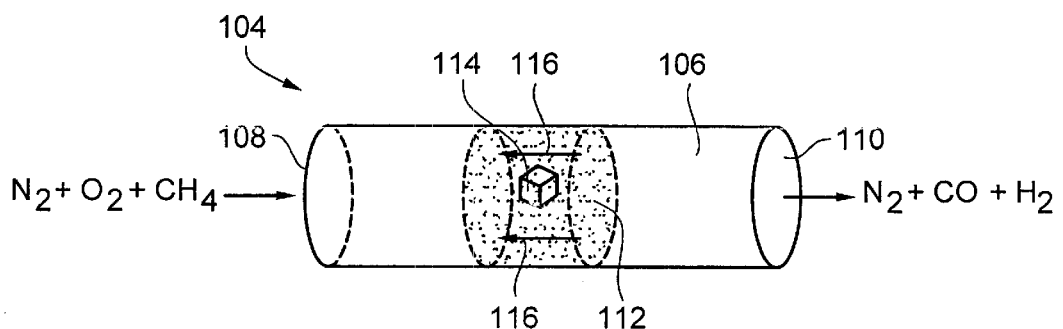
FIG. 2 schematically illustrates a first exemplary embodiment of a superadiabatic reactor usable in the system of FIG. 1.

FIG. 2 schematically illustrates a first exemplary embodiment of a superadiabatic reactor usable as reactor 100 in the system of FIG. 1, reactor 104. Reactor 104 includes a reactor vessel 106, which is preferably insulated so that heat transfer from the vessel is controlled, and preferably minimized. Vessel 106 includes an entrance 108 which allows a feed gas or feed gas mixture to enter the vessel, and an exit 110 which allows a product gas or product gas mixture to exit the vessel. Preferably, exit 110 is in fluid communication with pathway 102, illustrated in FIG. 1.

Reactor 104 includes a porous solid medium 112 in vessel 106, formed of a high temperature refractory, ceramic (e.g., aluminum oxide), or similar high temperature material, and includes gas pathways (not illustrated) therethrough, so that gas may readily flow through the medium 112. Reactor 104 also includes a start-up heater 114, simplistically illustrated in FIG. 2 as a box, which can be activated to heat up medium 112 to a temperature sufficient to ignite feed gas flowing through vessel 108. As will be described in greater detail below, heater 114 can be deactivated or turned off once a superadiabatic reactor in accordance with the present invention is generating enough energy to maintain its own process, which can result in significant energy savings over prior systems which require continuous heating to produce metal treatment gas, as discussed elsewhere herein. In order to monitor reactor 104, as well as other embodiments of reactor 100 described herein, the reactor is provided with temperature probes or thermocouples (not illustrated) mounted in heat transfer communication with the reactor, which provide data signals indicative of the temperature of the reactor. This temperature signal data can be used in an appropriate feedback control scheme, implemented in a manner well know to those skilled in the art, to control the temperature of the reactor and the combustion therein.

FIG. 2 illustrates an exemplary feed gas mixture entering entrance 108, the mixture including nitrogen, oxygen, and a hydrocarbon. Preferably, the feed gas is fuelrich, i.e., the hydrocarbon fuel is present in the feed gas in an amount greater than the stoichiometric amount for the combustion reaction for that hydrocarbon. Hydrocarbons useful in the present invention include, but are not limited to, methane, hexane, propane, butane, and methanol; methane is used herein as an exemplary hydrocarbon from which a product gas, hydrogen, is produced. As will be readily appreciated by one of ordinary skill in the art, the stoichiometric ratio for oxidizing (combusting) methane is 2, as evident from the above balanced equation. Thus, fuel-rich combustion of methane, for example, involves a $CH_4/O_2$ ratio greater than 2, while fuel-lean combustion of methane involves a ratio less than 2.

As seen from FIG. 2, the feed gas mixture enters vessel 106, and passes through medium 112. As startup heater 114 has already heated up medium 112 to a temperature sufficient to at least partially oxidize the methane, the methane is oxidized, producing carbon monoxide and hydrogen gas. The heat energy released by this exothermic reaction heats the medium 112, which heats incoming feed gas by radiation heat transfer, conduction heat transfer, or both. As the incoming feed gas is therefore preheated by energy from the reaction downstream of it, a reaction heat feedback 116 is established. Further details of excess enthalpy or superadiabatic combustion are well reviewed in Weinberg, above, and will not be further detailed herein.

Figure 3:
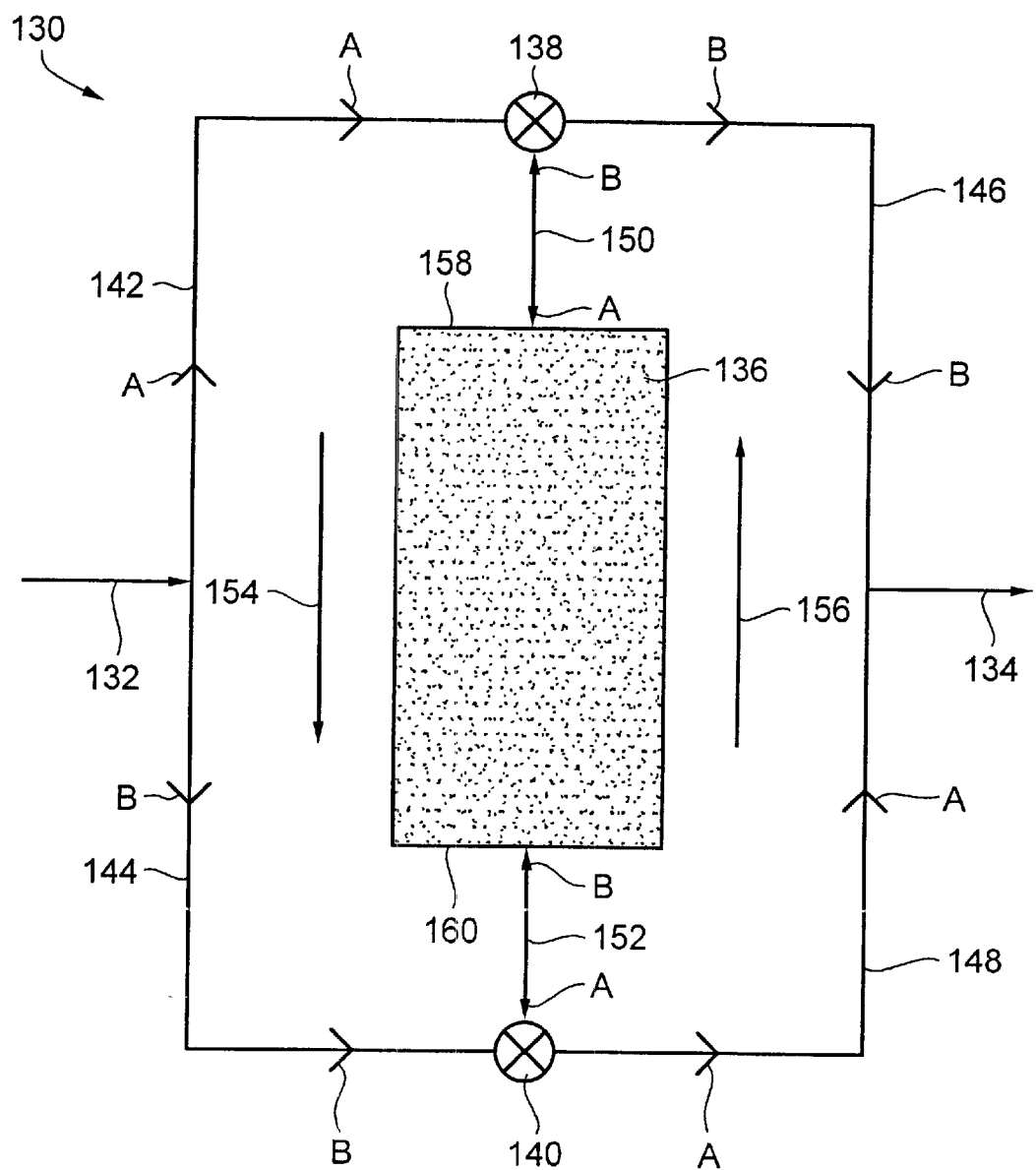
FIG. 3 schematically illustrates a second exemplary embodiment of a superadiabatic reactor usable in the system of FIG. 1.

FIG. 3 schematically illustrates a second exemplary embodiment of a superadiabatic reactor usable as reactor 100 in the system of FIG. 1, reactor 130. Reactor 130 includes a feed inlet 132, a product outlet 134, and an insulated porous solid medium 136, similar to medium 112. Medium 136 includes a start-up heater (not illustrated). First and second two-way valves 138, 140 are connected by fluid pathways 150, 152, to ports 158, 160, respectively, of medium 136. Reactor 130 includes a feed inlet flow path which includes an upper branch 142 and a lower branch 144. Upper branch 142 fluidly connects feed inlet 132 with valve 138, and lower branch 144 fluidly connects the feed inlet with valve 140. Reactor 130 also includes a product outlet flow path which includes an upper branch 146 and a lower branch 148. Upper branch 146 fluidly connects product outlet 134 with valve 138, and lower branch 148 fluidly connects the product outlet with valve 140.

Valves 138, 140 can be switched between two positions each, which together determine the direction of flow of gas through reactor 130. In a first set of positions of valves 138, 140, a first flow path "A" is established. Feed gas is prevented from flowing along lower inlet branch 144 by valve 140 and is allowed to flow through upper inlet branch 142 to valve 138. Valve 138 directs the flow of feed gas along pathway 150 into port 158 of medium 136. As the feed gas passes through medium 136, it is at least partially combusted to form a product gas, e.g., hydrogen, and the reaction products exit the medium at port 160. The product gas passes along pathway 152 and is directed by valve 140 along lower branch 148 to product outlet 134. When set in the first position, valve 138 prevents product gas from entering pathway 150 and reentering medium 136.

Valves 138, 140 can be positioned to establish a second flow path "B", which is, in one sense, opposite flow path "A". Feed gas is prevented from flowing along upper inlet branch 142 by valve 138 and is allowed to flow through lower inlet branch 144 to valve 140. Valve 140 directs the flow of feed gas along pathway 152 into port 160 of medium 136. As the feed gas passes through medium 136, it is at least partially combusted to form a product gas, e.g., hydrogen, and the reaction products exit the medium at port 158. The product gas passes along pathway 150 and is directed by valve 138 along upper branch 146 to product outlet 134. When set in the second position, valve 140 prevents product gas from entering pathway 152 and reentering medium 136.

Thus, when valves 138, 140 are set to establish path "A", gas flows through medium 136 in the direction indicated by arrow 154, and the high temperature volume of medium 136, e.g., the flame front from combustion of methane, expands or moves in the direction indicated by arrow 156. Similarly, when valves 138, 140 are set to establish path "B", gas flows through medium 136 in the direction indicated by arrow 156, and the high temperature volume of medium 136, e.g., the flame front from the combustion of methane, expands or moves in the direction indicated by arrow 154. To maintain the flame front within the medium 136, and therefore to prevent the flame from flashing back into the feed gas supply, and also to trap heat in the porous medium, valves 138, 140 are switched between the first and second sets of positions, which reverses the flow as described above. By reversing the flow directions through medium 136, the flame front can be caused to move back and forth within the medium to maintain the medium at a very high temperature, thus allowing superadiabatic combustion to continuously occur.

Figure 4:
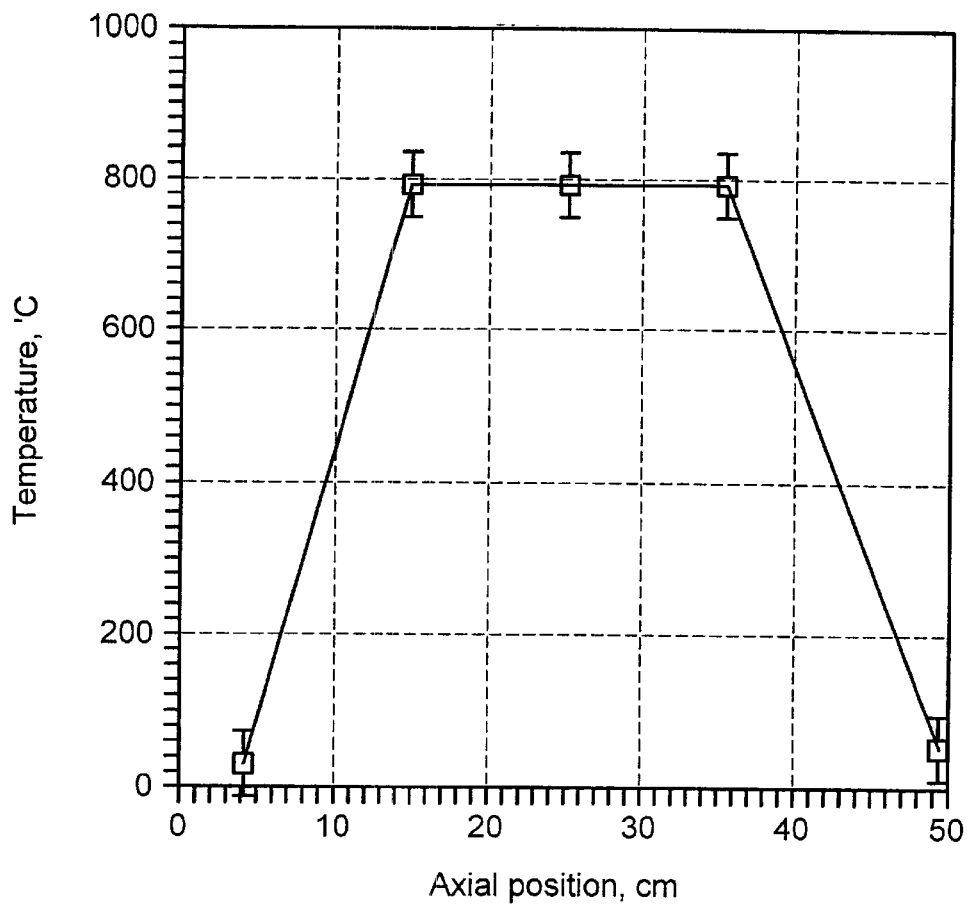
FIG. 4 illustrates a graph of a temperature profile of a portion of the reactor of FIG. 3 achievable in accordance with the present invention.

FIG. 4 illustrates a graph of a temperature profile medium 136 achievable in accordance with the present invention. As illustrated in FIG. 4, the average temperature of the medium at the inlet (left endpoint) and outlet (right endpoint) can be maintained around 30° C., while average temperatures within the porous solid medium can reach 800° C. by timing the flow reversal to occur when the heat wave nearly reaches the ports 158, 160. The excess enthalpy and heat transfer from combustion at this temperature is sufficient to maintain combustion in the porous medium without the need for an additional, external heater or catalyst.

Figure 5:
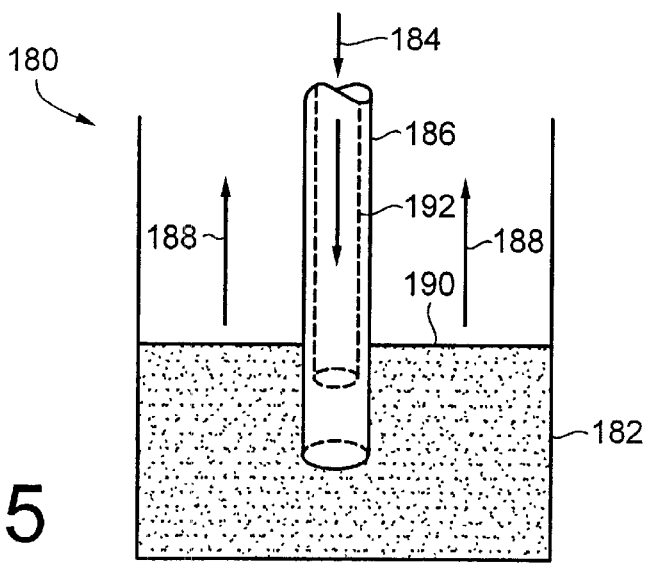
FIG. 5 illustrates a third exemplary embodiment of a superadiabatic reactor usable in the system of FIG. 1.

FIG. 5 illustrates a third exemplary embodiment of a superadiabatic reactor usable for reactor 100 in the system of FIG. 1, reactor 180. Reactor 180 is a recuperative-type reactor. Reactor 180 includes a bed of a porous solid medium 182 in which excess enthalpy combustion of the hydrocarbon fuel occurs. As illustrated in FIG. 5, porous bed 182 has an exposed top surface 190, and a feed tube 186 extends into the bed through the top surface. Porous bed 182 is otherwise closed off and, as in the other embodiments herein, is insulated and provided with a start-up heater (not illustrated). Thus, feed gas 184 is supplied through feed tube 186 into porous bed 182 where it reacts. Product gas 188 leaves the porous bed and flows around the feed tube. The portions of the porous bed which surround the feed tube, as well as the hot product gas, transfer heat to the feed tube and the feed gas therein, thus assisting in maintaining excess enthalpy combustion in reactor 180.

Reactor 180 can optionally further be provided with a carrier gas tube 192 (illustrated in phantom) inside feed tube 186, which can supply a non-reactive carrier gas into medium 182. The further provision of carrier gas tube 192 permits the total mass flow rate into reactor 180 to be controlled by controlling the mass or volume flow rate of the carrier gas flowing through the carrier gas tube, which in turn controls the temperature of the reactor.

Figure 6:
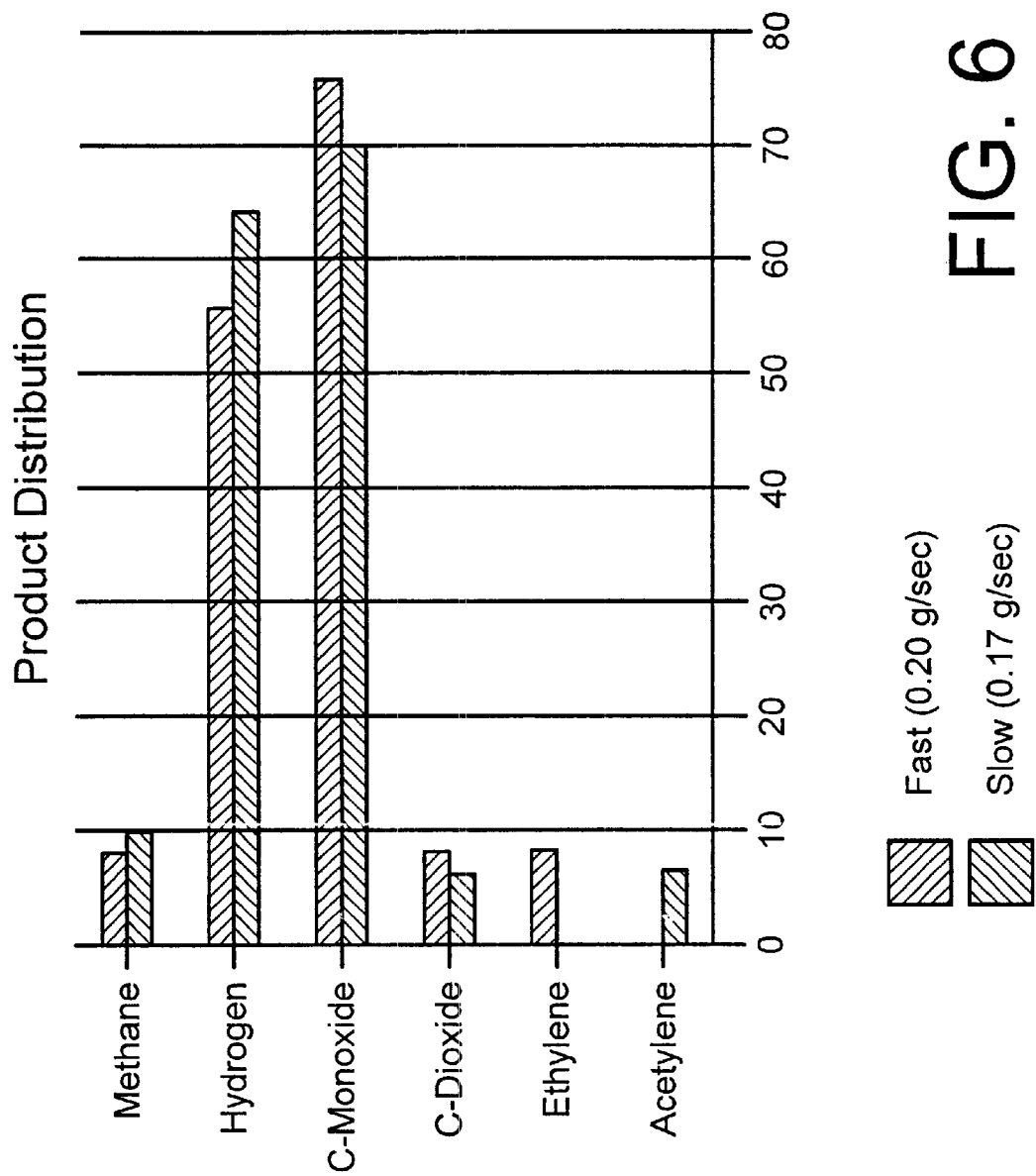
FIG. 6 illustrates a chart of the product distribution for methane conversion as a fractional percent, achievable in accordance with the present invention, for two feed flow rates.

FIG. 6 illustrates a chart of the product distribution for methane conversion, as a fractional percent, achievable with the reactor of FIG. 5, for two feed gas flow rates. For both flow rates, the ratio of hydrocarbon (methane) to oxygen was 1.40 (fuel lean). As demonstrated by the data represented in FIG. 6, the relatively slow mass flow rate (0.17 g/sec) produced a greater fractional percent of hydrogen than the fast mass flow rate (0.20 g/sec), which can be attributed to a higher combustion temperature because of the longer residence time of the reaction gas in the reactor.

Each of the aforementioned U.S. Patents and literature references is incorporated by reference herein in its entirety.

While the invention has been described in detail with reference to preferred embodiments thereof, it will be apparent to one skilled in the art that various changes can be made, and equivalents employed, without departing from the scope of the invention.

What is claimed is:

1. A process of heat treating metal, comprising the steps of:

providing a reactor including a porous solid medium having a first end and a closed second end, a port at said first end, and a feed tube extending into said porous solid medium through said first end;

flowing a hydrocarbon through said feed tube into said porous solid medium;

superadiabatically reacting said hydrocarbon with oxygen to produce hydrogen;

flowing said hydrogen out of said porous solid medium and around said feed tube; and exposing said metal to said hydrogen.

2. A process of heat treating metal, comprising the steps of:

providing a reactor including a porous solid medium having a first end and a second end, a first port at said first end and a second port at said second end, a first two-way valve in fluid communication with said first port and a second two-way valve in fluid communication with said second port, a feed flow path having an inlet, a first branch, and a second branch, a product flow path having an outlet, a first branch, and a second branch, said feed flow path first branch fluidly communicating said feed inlet with said first two-way valve, said feed flow path second branch fluidly communicating said feed inlet with said second two-way valve, said product flow path first branch fluidly communicating said product outlet with said first two-way valve, and said product flow path second branch fluidly communicating said product outlet with said second two-way valve;

flowing a hydrocarbon through said feed flow path into said porous medium;

superadiabatically reacting said hydrocarbon with oxygen to produce hydrogen; and exposing said metal to said hydrogen.

3. A process in accordance with claim 2, wherein said flowing step further comprises flowing said hydrocarbon serially through said feed flow path first branch, said first two-way valve, said first port, said porous solid medium, said second port, said second two-way valve, said product flow path second branch, and said product outlet.

4. A process in accordance with claim 3, wherein said flowing step further comprises actuating said first and second two-way valves when a flame front in said porous solid medium is adjacent said first port so that said flowing step comprises flowing said hydrocarbon serially through said feed flow path second branch, said second two-way valve, said second port, said porous solid medium, said first port, said first two-way valve, said product flow path first branch, and said product outlet.

* * * * *